Feb. 4, 1964 S. F. CRAWFORD, JR 3,120,426
PROCESS FOR THE PRODUCTION OF ARAGONITE CRYSTALS
Filed June 24, 1959
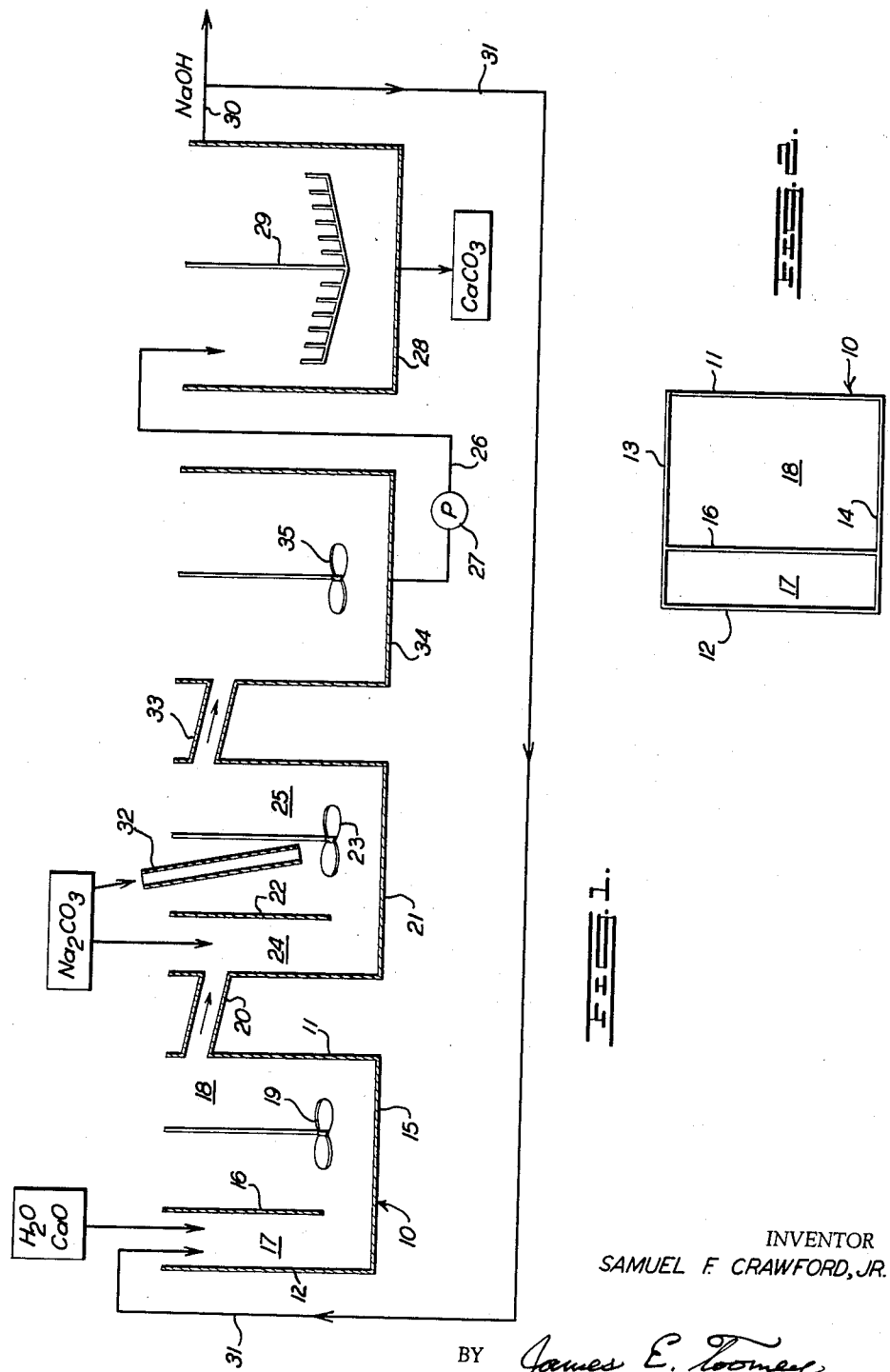
INVENTOR
SAMUEL F. CRAWFORD, JR.
BY James E. Toomey
ATTORNEY

United States Patent Office 3,120,426
Patented Feb. 4, 1964

3,120,426
PROCESS FOR THE PRODUCTION OF
ARAGONITE CRYSTALS
Samuel F. Crawford, Jr., Baton Rouge, La., assignor to
Kaiser Aluminum & Chemical Corporation, Oakland,
Calif., a corporation of Delaware
Filed June 24, 1959, Ser. No. 822,491
8 Claims. (Cl. 23—66)

This invention relates to a novel process of producing filter aids useful in the filtration of process liquors and more particularly to a novel process for the preparation of improved calcium carbonate filter aids comprising the aragonite crystalline form of calcium carbonate.

Filtration operations involve the separation of solids from a liquid whereby the solids containing liquid is passed through a porous filter medium such as a filter cloth. A cake of solids is retained on the surface of the porous medium and if the porous medium is properly chosen, there should be a minimum of plugging or clogging of the pores, and a minimum of finer solids should pass through the porous medium with the liquid.

The filtration of process liquors which contain slimy, finely divided solids and/or colloidal particles, is particularly difficult since the solids and/or particles have a tendency, depending on their size, to pass through the porous filter medium with the liquor and/or clog the pores of the filter medium. This results in a reduced rate of filtration. To overcome this problem, proper use of certain filter aids has been successful. The filter aid promotes filtration by acting as a clarifying agent, improves filtration rates, and prevents clogging or plugging of the pores of the filter medium.

Various filter aids, which are finely divided materials, are presently used, such as kieselguhr, diatomaceous earth, charcoal, fuller's earth, and the like. Many of the presently available filter aids have limited application and are not suitable for use, for example, in filtering hot, alkaline liquors. In the Bayer process for the production of alumina from bauxite ore, it is necessary to separate from the hot caustic aluminate extraction liquor, subsequent to the digestion step, the insoluble material of the ore commonly called "red mud." A settling or thickening step is usually performed on the red mud laden liquor prior to a filtration step to remove the bulk of the red mud. The filtration step removes the portion of red mud particles which remain suspended in the hot liquor.

A calcium carbonate sludge has found use as a filter aid in the Bayer process for filtering the red mud laden hot caustic aluminate liquor. The sludge is obtained from a causticizing operation which involves reacting slaked lime, $Ca(OH)_2$, with a sodium carbonate solution to produce sodium hydroxide in solution and a precipitated sludge of calcium carbonate. The sludge usually produced by the above reaction was found to be almost entirely the calcite crystalline form of calcium carbonate. The calcite particles in the sludge, when viewed under a microscope, appear as rough spheres about 2.5 microns in diameter with almost no variation in size.

The calcium carbonate sludge produced containing the calcite is fairly effective as a filter aid. However, there are times when the red mud laden liquors are of such poor quality that the calcite sludge produced by the causticizing operation is inadequate for required filtration performance.

A more suitable filter aid has been sought for use in the filtration of hot alkaline liquors and in particular to improve the filtration rates of red mud laden hot caustic aluminate liquors.

There are several crystal systems of calcium carbonate. Calcite is the more common form found in nature. Almost all the inland deposits of limestone consist of the stable calcite mineral. A less stable and less common form sometimes found in nature is aragonite. Aragonite produced in accordance with this invention appears as single needle-like particles or needle clusters when viewed under a microscope. The particle size usually varies from about one to five microns in width and from about five to about forty microns in length. However, larger particle sizes have been obtained.

In a copending U.S. application, Serial Number 807,775, filed April 21, 1959, R. L. Jones has disclosed that the aragonite crystalline form of calcium carbonate is a far superior filter aid than the calcite form in filtering process liquors, in particular, red mud laden, hot caustic aluminate liquor.

The present invention provides a novel process for preparing calcium carbonate in the aragonite crystalline form which is useful as a filter aid in filtering process liquors.

According to this invention, the production of calcium carbonate in the aragonite crystal form is attained by the addition of a sodium carbonate solution to a preslaked lime slurry bath under controlled conditions of reaction temperatures and degree of dilution of the reaction medium and reactants. This particular procedure favorably effects the formation and growth of aragonite crystals instead of the calcite crystals of calcium carbonate.

The following examples exemplify the procedures to be used to produce calcium carbonate in the aragonite crystal form.

Example 1

To a lime slaker unit equipped with an agitator there were continuously added, with agitation, water, CaO (obtained from calcined clam shells), and NaOH to obtain concentrations of 105 g./l. CaO and 98 g./l. of NaOH. The temperature was maintained at 210° F. in the slaker unit by the addition of steam. The resulting slaked lime slurry was overflowed into a reaction vessel equipped with an agitator. To the reaction vessel containing the slaked lime slurry there were continuously added $H_2O$ and $Na_2CO_3$ in amounts to obtain concentrations of 160 g./l. NaOH and 151 g./l. $CaCO_3$ at completion of the causticizing reaction. The temperature of the reaction vessel was maintained at between 200–210° F. The reaction produced a precipitated sludge in the reaction vessel which was pumped to a thickener vessel. The thickener underflow contained 205 g./l. $CaCO_3$ which analyzed 95% aragonite crystals.

Example 2

To a lime slaker unit equipped with an agitator there were continuously added, with agitation, water, CaO (obtained from calcined limestone), and NaOH to obtain a concentration of 106 g./l. CaO and 115 g./l. NaOH. The temperature of the slaker unit was maintained between 200° and 210° F. The slaked lime slurry formed in the slaker was overflowed into a reactor vessel equipped with an agitator. To the reactor vessel containing the slaked lime slurry, there were continuously added $H_2O$ and $Na_2CO_3$ in amounts to obtain concentrations of 158 g./l. NaOH and 149 g./l. $CaCO_3$. The temperature of the reactor was maintained between 200° and 210° F. The reaction produced a precipitated sludge in the reactor vessel which was pumped to a thickener vessel. The thickener underflow contained 190 g./l. $CaCO_3$ which analyzed 100% aragonite.

Example 3

Referring to the drawings, FIGURE 1 shows a schematic flowsheet of apparatus for practicing a preferred embodiment of the method of this invention. FIGURE 2 shows a top view of the lime slaker unit of FIGURE 1 particularly showing the position of the baffle member.

A slaker tank 10 containing sides 11, 12, 13, 14, and bottom 15 is provided for the slaking of lime. Within the tank 10 there is provided a baffle member 16 positioned near one side 12 of the tank and extending between walls 13 and 14 providing a baffled area 17 (FIG. 2). The baffle 16 extends almost to the bottom 15 of the tank and allows the solution in the tank to flow from the baffled area 17, under the baffle 16, and to the larger area 18 of the tank. $H_2O$ and CaO (from calcined clam shells) are continuously added to the baffled area 17. NaOH solution from the thickener overflow line 30 is recycled through line 31 and is also continuously added to baffled area 17. The agitator 19 mixes the ingredients and the three ingredients are added in amounts to provide a concentration in the larger area 18 of 105 g./l. CaO and 98 g./l. NaOH. The purpose of the baffle 16 is to obtain rapid slaking of the lime. The temperature within the lime slaker tank is maintained at about 200°–210° F. by the addition of steam. The aqueous slaked lime slurry in area 18 is overflowed through overflow line 20 into a baffled area 24 of reactor tank 21. Tank 21 contains a baffle 22 and agitator 23 similar in construction to slaker tank 10. Sufficient $Na_2CO_3$ is continuously added to the turbulent baffled area 24 where it is thoroughly dispersed and reacts with the slaked lime and provides an ultimate concentration of 129 g./l. NaOH, 68 g./l. CaCO, and 63 g./l. $Ca(OH)_2$. Turbulence in baffled area 24 may be supplied by an additional agitator (not shown). The agitator 23 continuously mixes the solution within the reactor 21 and causes the solution from area 24 to pass below baffle 22 and into area 25. Reaction between the $Na_2CO_3$ and $Ca(OH)_2$ continues. Meanwhile, further amounts of $Na_2CO_3$ are added to area 25 to provide a concentration of the solution within area 25 of 160 g./l. NaOH and 151 g./l. $CaCO_3$. The further addition of $Na_2CO_3$ is fed through line 32 in order that the $Na_2CO_3$ is injected into the immediate area of the agitator 23. Rapid mechanical dispersion of the $Na_2CO_3$ throughout the solution is obtained thereby. The temperature of the reactor is maintained between 200° and 210° F. The solution is continuously withdrawn from the reactor 21 through overflow line 33 into a second reactor 34 containing agitator 35. The reaction proceeds further towards completion in reactor 34. The solution is continuously withdrawn from the reactor 34 through underflow line 26 containing pump 27 and is continuously pumped into a thickener 28 equipped with a raking mechanism 29. A thickened $CaCO_3$ sludge is removed as underflow from the bottom of the thickener. The underflow contains 205 g./l. $CaCO_3$ which analyzes about 95% aragonite crystals. The thickener overflow is removed through line 30 and a portion thereof is recycled to the slaker unit 10 through line 31. The overflow solution removed through line 30 contains 160 g./l. NaOH (expressed as equivalent $Na_2CO_3$) and 15 g./l. $Na_2CO_3$.

In accordance with this invention, the reaction conditions of the causticizing reaction are critical in order to produce the aragonite crystal form of calcium carbonate. Generally, those factors which tend to retard the causticizing reaction favor formation and growth of aragonite. This pertains to the causticizing reaction in general, but more particularly to localized reactions which are accelerated by over concentration of one reagent, for example, where on reagent is added as a stream to a solution of the other and over concentration results in the localized area at the point of addition. Over concentration of lime slurry in this manner has the most detrimental effect. Calcite crystals are usually formed when a lime slurry stream is added to a gently agitated sodium carbonate solution.

The following conditions tend to retard the overall causticizing reaction, prevent high local reaction rates, and favor the formation of aragonite crystals. (1) water dilution of the sodium carbonate solution and/or water dilution of the lime slurry. (2) a further dilution of the reaction bath with recycled caustic solution produced in the reaction as exemplified by Example 3 above. (3) The immediate mechanical dispersion of the sodium carbonate solution into the reaction bath. Incremental (multiple addition points) sodium carbonate addition is one manner of accomplishing this and is very effective. (4) Elevated reaction temperature.

The concentration of NaOH in the reactor is preferably kept between 120–250 g./l. (expressed as equivalent $Na_2CO_3$) since this range is conducive to aragonite crystal formation, and the causticizing reaction proceeds favorably to greater conversions under dilute concentrations. The dilution factor is satisfied not only by the concentration of the reactants, but also by splitting the addition of the $Na_2CO_3$ and rapid dispersion thereof into the solution. Thus, in Example 3 wherein the $Na_2CO_3$ is added to the baffled area 24 and also to area 25, the $Na_2CO_3$ instead can be added to each of two or more reaction vessels which contain the slaked lime solution obtained from slaker unit 10; such vessels may be arranged in series or in parallel ahead of the thickener 28. A slight excess of lime over the stoichiometric quantity is ordinarily used, for efficient conversion of sodium carbonate. Such a slight excess is not detrimental to aragonite formation, whereas a greater excess is detrimental.

The reaction temperatures are critical in aragonite formation and temperatures of 150° F. (66° C.) to the atmospheric boiling point of the solution are preferred. The temperatures are not critical in the lime slaking step.

The addition of aragonite seed crystals to the reactor is conductive to and accelerates the production of aragonite crystals and the process may be practiced to advantage in this manner. The addition of seed crystals, however, is optional and not necessary for the production of aragonite crystals according to the process of the invention. Contaminants in the solution such as alumina and other extraneous materials may adversely affect aragonite crystal formation and therefore the reactants used in the process should preferably be relatively free of contaminants, for more efficient production.

The lime used as one of the reactants may be obtained from any source such as from clam shells, limestone, etc., which have been calcined.

What is claimed is:

1. A process of producing the aragonite crystal form of calcium carbonate by reacting lime and sodium carbonate, which comprises preparing an aqueous slaked lime slurry, introducing sodium carbonate as a continuous stream into said slurry with constant agitation of the reaction mixture to rapidly disperse the sodium carbonate in said slurry and avoid the formation of localized areas of overconcentration, maintaining the temperature of the reaction mixture between about 150° F. and the atmospheric boiling point of the reaction mixture, the reactants provided in amounts sufficient to produce a concentration of about 120–250 grams per liter of sodium hydroxide, and recovering the aragonite crystals of calcium carbonate formed as single needlelike particles and needle clusters.

2. A process of producing the aragonite crystal form of calcium carbonate by reacting lime and sodium carbonate, which comprises preparing an aqueous slaked lime slurry, continuously introducing sodium carbonate as a plurality of streams into said slurry with constant agitation of the reaction mixture to rapidly disperse the sodium carbonate in said slurry and avoid the formation of localized areas of overconcentration, maintaining the temperature of the reaction mixture between about 150° F. and the atmospheric boiling point of the reaction mixture, the reactants provided in approximately stoichiometric amounts sufficient to produce a concentration of about 120–250 grams per liter of sodium hydroxide, and separating the aragonite crystals of calcium carbonate formed as single needlelike particles and needle clusters in said reaction mixture.

3. A continuous process for producing the aragonite crystal form of calcium carbonate by reacting lime and sodium carbonate, which comprises continuously preparing an aqueous slaked lime slurry containing NaOH, continuously feeding said slurry into a plurality of reaction zones, continuously introducing streams of sodium carbonate into said reaction zones, continuously agitating the reaction mixtures in said reaction zones to rapidly disperse the sodium carbonate at points of addition in said slurry and avoid the formation of localized areas of overconcentration, maintaining the temperature of the reaction mixtures between 150° F. and the atmospheric boiling point of the reaction mixture, maintaining the concentration of NaOH in said reaction zones at between about 120 to 250 grams per liter, continuously removing sodium hydroxide and aragonite crystals of calcium carbonate from said reaction zones, said aragonite crystals being in the form of single needlelike particles and needle clusters, and continuously separating said crystals from said sodium hydroxide.

4. The process of claim 3 wherein said reactants are provided in substantially stoichiometric amounts.

5. The process of claim 3 wherein said temperature is maintained between 200° and 210° F.

6. The process of claim 3 wherein a portion of said sodium hydroxide separated from said crystals is recycled and added to said aqueous slurry of lime.

7. The process of claim 3 wherein seed crystals of aragonite are added to said reaction zones.

8. The process of claim 3 wherein said sodium carbonate is a dilute aqueous solution.

References Cited in the file of this patent

UNITED STATES PATENTS

| 2,140,375 | Allen _____ Dec. 13, 1938 |
| 2,198,640 | Stump _____ Apr. 30, 1940 |
| 2,211,908 | O'Connor _____ Aug. 20, 1940 |
| 2,527,340 | Taylor _____ Oct. 24, 1950 |

FOREIGN PATENTS

| 479,054 | Great Britain _____ Jan. 31, 1938 |

OTHER REFERENCES

Mellor: "Comprehensive Treatise on Inorganic and Theoretical Chemistry," vol. 3, 1923, Longmans, Green and Co., pp. 817–818.

Leek: "An American Story of Precipitated Chalk," Industrial Chemical Sales Co., Inc., New York, 1933, page 14.